United States Patent [19]

Ōzaki et al.

[11] Patent Number: 5,018,701
[45] Date of Patent: May 28, 1991

[54] VIBRATION ISOLATING SUPPORT APPARATUS

[75] Inventors: Nobuo Ōzaki, Tokorozawa; Shoichi Morikawa, Kodaira, both of Japan

[73] Assignee: Bridgestone Corporation, Tokyo, Japan

[21] Appl. No.: 467,464

[22] Filed: Jan. 19, 1990

[30] Foreign Application Priority Data

Jan. 25, 1989 [JP] Japan ................................ 1-15575

[51] Int. Cl.$^5$ ........................................... F16M 13/00
[52] U.S. Cl. ..................... 248/631; 52/167 R; 248/638; 267/64.21; 267/141.1
[58] Field of Search .............. 248/631, 632, 633, 634, 248/638, 618, 678, 679, 621, 575, 562; 52/167; 267/64.16, 64.17, 64.21, 141.1

[56] References Cited

U.S. PATENT DOCUMENTS

| | | | |
|---|---|---|---|
| 2,878,012 | 3/1959 | Crites | 248/631 X |
| 4,371,143 | 2/1983 | Ishida et al. | 248/638 |
| 4,402,483 | 9/1983 | Kurabayashi et al. | 248/638 X |
| 4,527,365 | 7/1985 | Yoshizawa et al. | 52/167 |
| 4,593,501 | 6/1986 | Delfosse | 248/638 X |
| 4,661,925 | 8/1988 | Fukahori et al. | 267/141.1 X |
| 4,662,133 | 5/1987 | Kondo | 52/167 |
| 4,726,161 | 2/1980 | Yaghoubian | 52/167 |

FOREIGN PATENT DOCUMENTS

| | | |
|---|---|---|
| 1658910 | 11/1970 | Fed. Rep. of Germany . |
| 62-224750 | 10/1987 | Japan . |
| 63-89751 | 4/1988 | Japan . |
| 63-199938 | 8/1988 | Japan . |
| 63-300160 | 12/1988 | Japan . |
| 2135422 | 8/1984 | United Kingdom ............. 267/64.17 |

OTHER PUBLICATIONS

European Search Report.
Patent Abstracts of Japan, vol. 11, No. 191 (M-600)[2638], 19th Jun. 1987, and JP-A-62 17 439 (Showa Electric Wire of Cable Co., Ltd) 26-01-1987.
Patent Abstracts of Japan, vol. 9, No. 333 (M-443)[2056], 27th Dec. 1985, and JP-A-60 164 520 (Mitsubishi Denki) 27-08, 1985.

*Primary Examiner*—Ramon O. Ramirez
*Attorney, Agent, or Firm*—Sughrue, Mion, Zinn, Macpeak & Seas

[57] ABSTRACT

A vibration isolating support apparatus comprises an air spring in the form of the bellows and a multiple laminated rubber assembly. The air spring and the multiple laminated rubber assembly are vertically stacked and integrally connected each other. The multiple laminated rubber assembly is composed of a plurality of stacks of a plurality of laminated rubbers and a plurality of stabilizing plates which are inserted between and connected to the upper and lower ends of the adjacent laminated rubbers in the stacks.

4 Claims, 5 Drawing Sheets

FIG_4

VIBRATION ISOLATING SUPPORT APPARATUS

BACKGROUND OF THE INVENTION (1) Field of the Invention

The present invention relates to a vibration isolating support apparatus for damping transfer of vibration caused by earthquake or the like at electronic data-processing centers, nuclear reactor equipment, art museums, museums and the other important security institutions.

(2) Related Art Statement

It has been known that the natural frequency of middle and low storied buildings is in a range of about 1~2 Hz and the peak frequency of earthquake is in a range of 5~10 Hz. Upon earthquake occurrence, however the building resonates with the predominant portion of the seismic wave to increase shaking of the building and consequently substantial damage may occur.

When a computer or the like is set up in such a building, the computer will fall down by the earthquake and be greatly damaged.

In order to prevent such damage, it has been proposed to use a three dimensional vibration isolating support apparatus which is composed of an air spring and a laminated rubber so as to damp both horizontal vibration and vertical vibration simultaneously.

The laminated rubber is constructed by alternately stacking a rubber like elastic material and a reinforcing sheet such as a steel sheet or a hard plastic sheet and then integrally connecting them. It has a stiffness and a high spring constant against a vertical load and a flexibility and a low spring constant against a horizontal load owing to the mechanical properties of the rubber like elastic material. The ratio of vertical and horizontal spring constants is in a range of 100 to 1,000. A support apparatus comprising such a laminated rubber alone has a sufficient vibration isolating function in the horizontal direction, but an insufficient vibration isolating function in the vertical direction.

However, the air spring has an excellent vibration isolating function in the vertical direction.

The aforementioned three dimensional vibration isolating support apparatus is for example, disclosed in Japanese Patent Application Laid-open No. 63-89,751.

The conventional three dimensional vibration isolating support apparatus comprises a large laminated rubber, an inner cylinder secured to one end of the laminated rubber, an outer cylinder surrounding the inner cylinder from an opposite side of the laminated rubber and a diaphragm interposed between the inner cylinder and the outer cylinder to define a closed space which is filled with air under pressure.

Such a conventional three dimensional arrangement has drawbacks as follows.

(i) A large mounting space is required under a floor since a load to be supported by one vibration isolating support apparatus must be large in order to make the shape of the laminated rubber flat and therefore when the vibration isolating support apparatus is used in a vibration isolating floor, the height of the vibration isolating floor becomes higher.

(ii) It is difficult to obtain a sufficient vibration isolating effect since the load must be large in order to make the laminated rubber flat and therefore the natural frequency in the horizontal direction of the vibration isolating support apparatus could not be reduced when the load is small.

(iii) Additional dampers are required in order to restrict a horizontal displacement caused by earthquake when the vibration isolating support apparatus is actually applied to the building.

SUMMARY OF THE INVENTION

It is an object of the present invention to remove the aforementioned drawbacks of the prior art and to provide a vibration isolating support apparatus having an excellent vibration isolating function with a load in a wide range from a high load to a low load without additional dampers.

According to the present invention, there is provided a vibration isolating support apparatus comprising an air spring of bellows type and a multiple laminated rubber assembly, the multiple laminated rubber assembly includes a plurality of stacks of a plurality of laminated rubbers, laminated rubbers in each stage of the stacks are connected to each other at upper and lower ends thereof by means of stabilizing plates, and the air spring and the multiple laminated rubber assembly are vertically stacked.

The air spring of the bellows type generally has a natural frequency of about 1~2 Hz in the vertical direction. Accordingly, the vertical component of vibration caused by earthquake can be substantially removed completely by the air spring.

The multiple laminated rubber assembly generally has a natural frequency not more than 1 Hz in the horizontal direction. Accordingly, if a high damping rubber having an equivalent damping coefficient of about 15% is used as the rubber material of the laminated rubber, it is easy to improve the maximum absorbable displacement in the horizontal direction up to about 200 mm and therefore the displacement upon a big earthquake can be sufficiently absorbed by the multiple laminated rubber assembly.

The invention will be now described more in detail with reference to the accompanying drawings.

DESCRIPTION OF THE PREFERRED EMBODIMENTS

Figure 1:
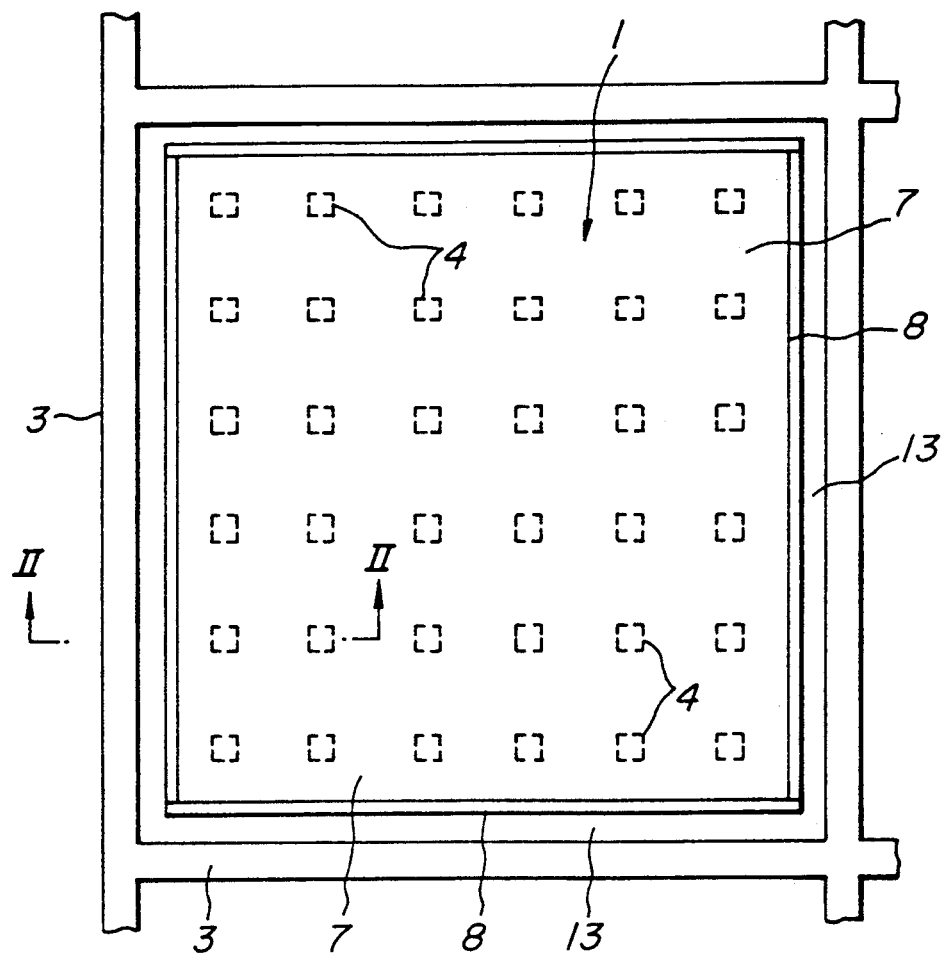
FIG. 1 is a plan view of an embodiment of a vibration isolating floor with the vibration isolating support apparatus shown in FIG. 3.
Figure 2:
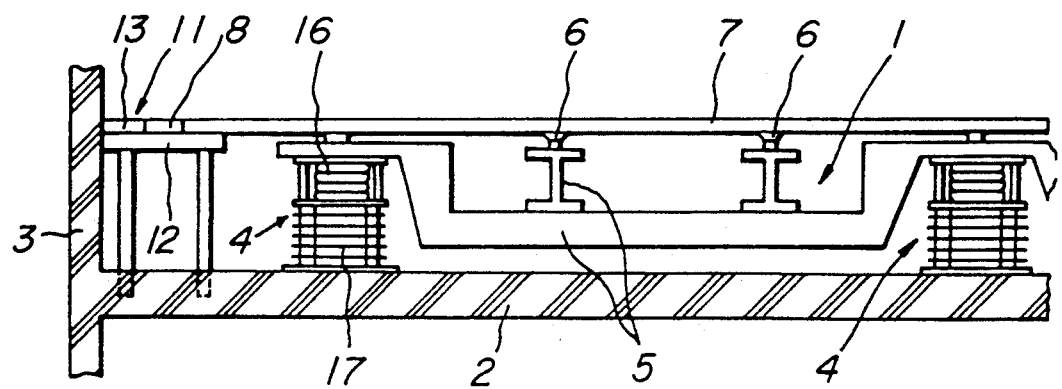
FIG. 2 is an enlarged sectional view taken along a line II—II of FIG. 1.

Referring to FIGS. 1 and 2, a building includes a vibration isolating floor structure 1 which is supported on a floor slab 2 and surrounded by side wall slabs 3. A three dimensional vibration isolating support apparatus 4 according to the present invention is used in the floor structure 1. The vibration isolating floor structure 1 in this embodiment consists of a plurality of vibration isolating support apparatus 4 which are arranged on the floor slab 2 spaced apart in the lengthwise and crosswise of the floor structure by a predetermined distance, for example, 300 mm, frames 5 supported on the vibration isolating support apparatus 4 and extended in lengthwise and crosswise of the floor structure, height adjusting pedestals 6 mounted on the frames 5 and spaced apart by a predetermined distance, and a floor panel 7 supported on the pedestals 6.

A fixed floor structure 11 is arranged around the vibration isolating floor structure 1 with a predetermined space therebetween.

The fixed floor structure 11 having a width is arranged along the inside surface of the wall slab 3 and consists of a fixed support 12 fixed on the floor slab 2 and a fixed floor panel 13 supported on the fixed support 12.

The fixed support 12 has a width for slidably supporting the peripheral portion of the movable floor panel 7 on the vibration isolated floor structure 1.

A shock absorbing floor panel 8 is interposed between the fixed floor panel 13 and the movable floor panel 7 for absorbing a horizontal displacement occurring between both floor panels 13 and 7 by the earthquake.

The movable floor panel 7 constitutes the vibration isolating floor and occupies substantially the whole area of the floor, while the fixed floor panel 13 vibrates together with the building and is limited to minimum area.

The shock absorbing floor panel 8 arranged along the entire periphery of the movable floor panel 7 may be an expansible panel which can be easily shrunk by its width when it is subjected to a horizontal force. For example, the shock absorbing floor panel 8 may be made of a rubber like elastic material or constructed with a plurality of blocks having inclined surfaces which are slidable on each other.

A finishing material such as a carpet or pile may be covered on the surface of the floor including the movable floor panel 7, fixed to floor panel 13 and shock absorbing floor panel 8.

FIG. 1 illustrates an embodiment of the vibration isolating support apparatus according to the present invention.

Figure 3:
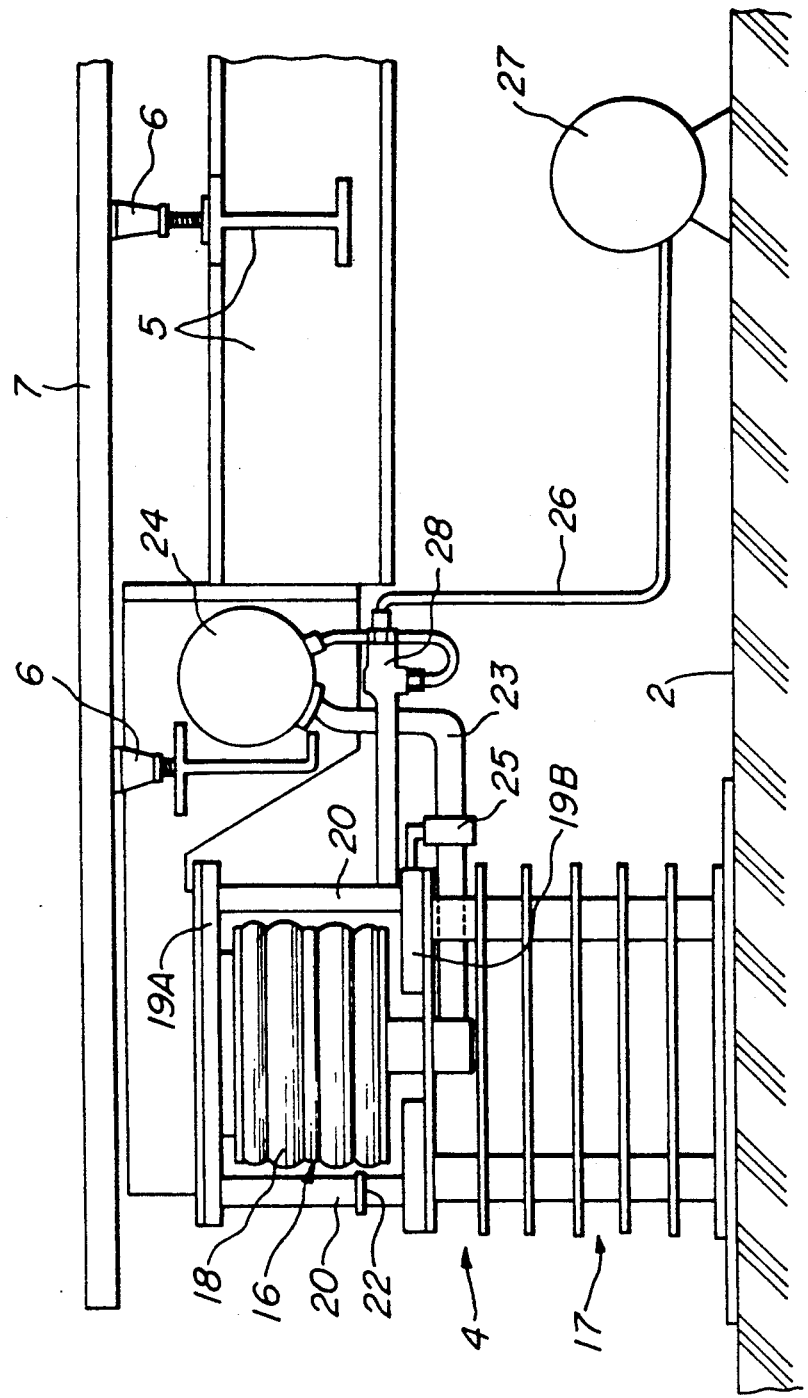
FIG. 3 is a elevational view illustrating an embodiment of the vibration isolating support apparatus according to the present invention in a state applied for isolating vibration.

FIG. 3 illustrates the vibration isolating support apparatus 4 set up at the peripheral portion of the vibration isolating floor structure 1 shown in FIG. 1 in large scale and like parts have been given like reference numerals.

Referring to FIG. 3, the vibration isolating support apparatus 4 is composed of an air spring 16 of bellows type and a multiple laminated rubber assembly 17 which are vertically stacked and integrally connected.

The air spring 16 includes a bellows 18 formed of an air bag filled with air under pressure and end plates 19A and 19B fixed to the upper and lower ends thereof. The lower end plate 19B is vertically slidable along four guide posts 20 secured to the corners of the upper end plate 19A. Each guide post 20 has a stop 22 for limiting the maximum compressed position of the air spring 16.

The bellows 18 is connected to an auxiliary air tank 24 by an air supply line 23 which is provided with a throttle 25. The auxiliary air tank 24 is connected to an air source 27 such as a compressor by a tube 26 which is provided with a leveling valve 28.

The auxiliary air tank 24 is provided for adjusting the natural frequency in the vertical direction by changing pressure and volume of air in the bellows 18 having a volume of about 10 l.

The throttle 25 is provided for applying vibration damping function to the air spring (bellows) 18.

The leveling valve 28 is provided for controlling the height of the vibration isolating support apparatus 4 and hence the level of the vibration isolating floor panel 7 in the embodiment shown in FIG. 3.

The air spring 16 of the bellows type has end plates 19A and 19B which are vertically guided by four guide posts 20, so that the air spring is displaceable only in the vertical direction without displacement in the horizontal direction.

Such an air spring 16 can be easily set at a natural frequency in the vertical direction of about 1~2 Hz so that the vertical component of vibration caused by an earthquake is substantially removed.

Figure 4:
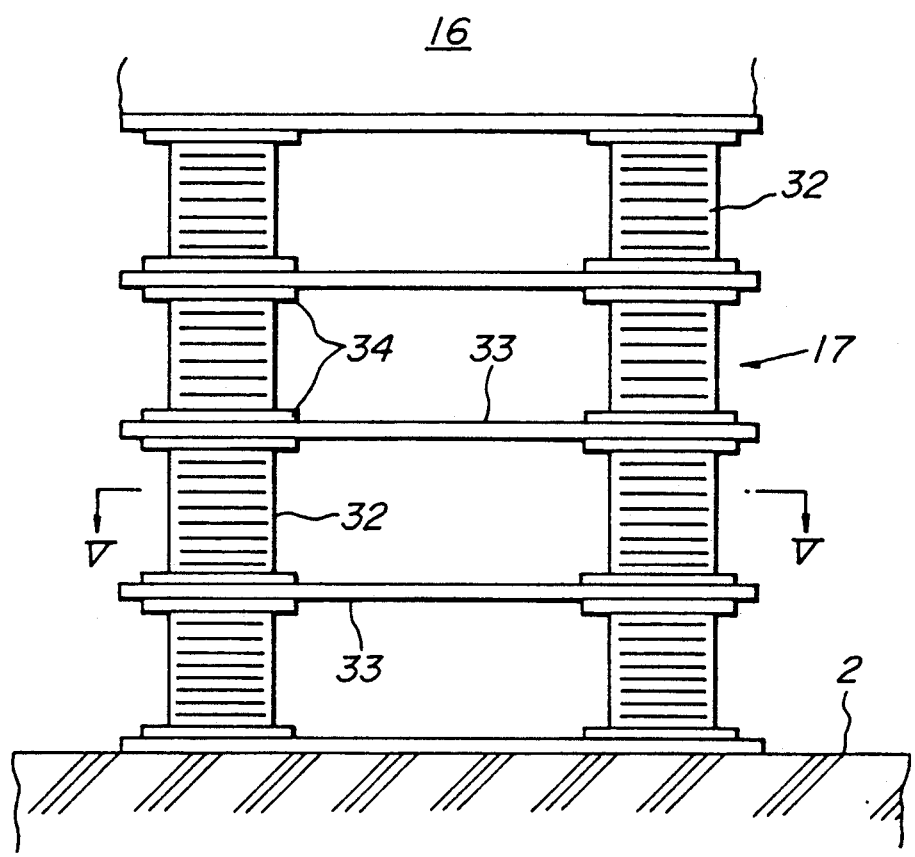
FIG. 4 is an enlarged side view of a multiple laminated rubber assembly shown in FIG. 3.
Figure 5:
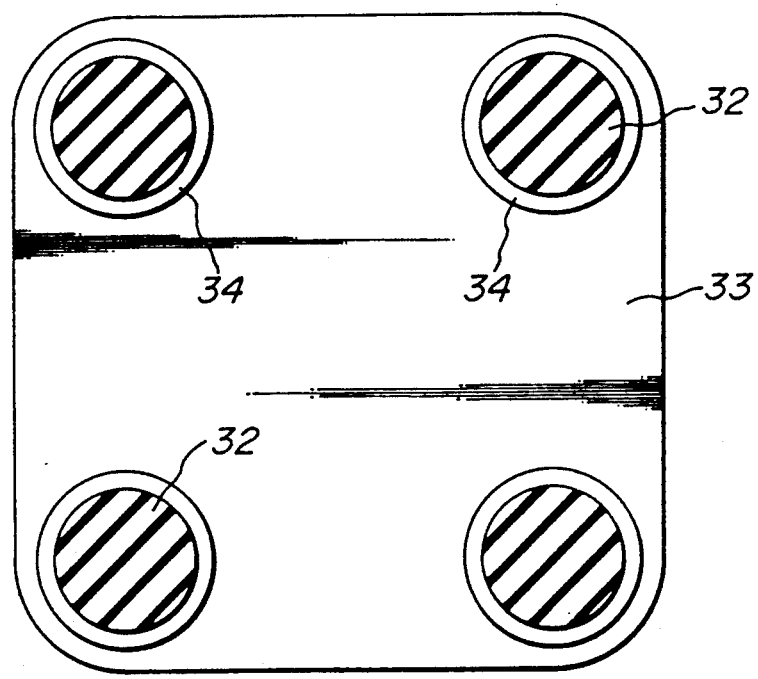
FIG. 5 is a sectional view taken along a line V—V of FIG. 4.

FIG. 4 is a side view illustrating the multiple laminated rubber assembly 17 in detail and FIG. 5 is a sectional view taken along a line V—V of FIG. 4.

Referring to FIGS. 4 and 5, the multiple laminated rubber assembly 17 comprises a plurality of stacks (four stacks in the embodiment as shown) of a plurality of laminated rubbers 32 (four laminated rubbers in the embodiment as shown). The laminated rubbers 32 positioned at the same stages in the stacks are connected to each other at the upper and lower ends by means of a stabilizing plate 33.

Each of the laminated rubbers 32 is composed of rubber like elastic sheets and reinforcing sheets such as steel sheets or hard plastic sheets which are alternately laminated and integrally connected and is secured to the stabilizing plates 33 by means of flanges.

The multiple laminated rubber assembly 17 is fixed at its lower end to the floor slab 2 and is connected at its upper end to the air spring 16.

Figure 6:
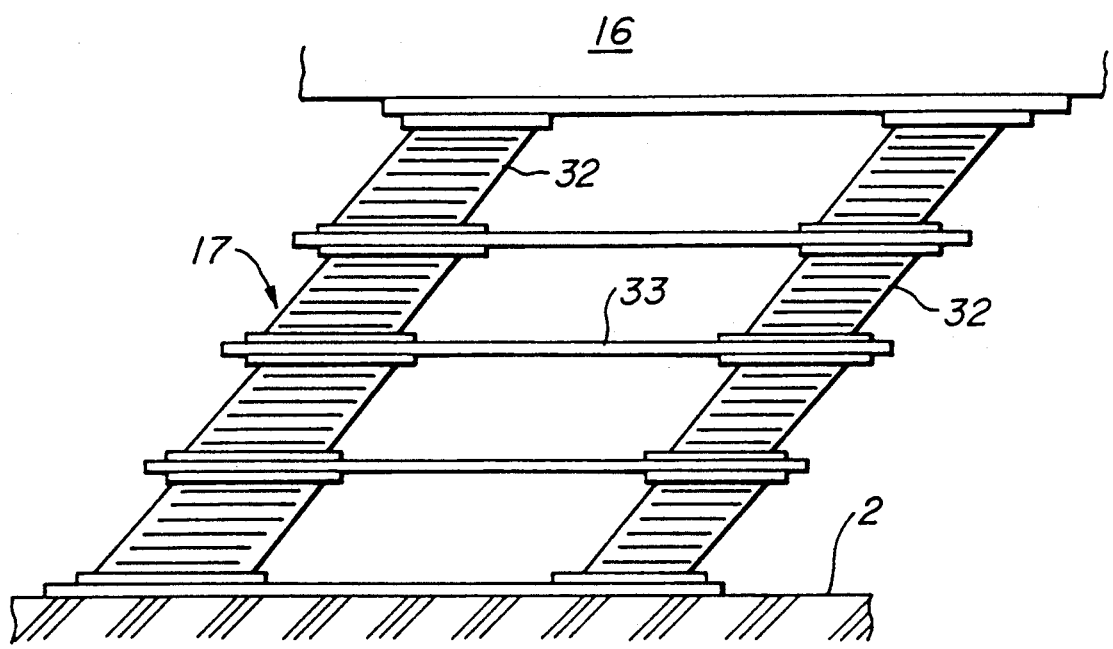
FIG. 6 is a schematic side view illustrating the multiple laminated rubber assembly shown in FIG. 4 in a state displaced in a horizontal direction.

FIG. 6 illustrates the multiple laminated rubber assembly in a state displaced in the horizontal direction by seismic force.

The multiple laminated rubber assembly 17 including laminated rubbers 32 as elemental elastic bodies connected to the stabilizing plate 33 as shown in FIGS. 4 and 5 is stable as the whole because each laminated rubber 32 is restricted at the upper and lower ends by the stabilizing plate 33.

Accordingly, when an earthquake occurs, the multiple laminated rubber assembly is displaceable in the horizontal direction as shown in FIG. 6 without buckling. Therefore, the load to be supported per unit area is higher than that supported by a single laminated rubber.

The use of the multiple laminated rubber assembly 17 as mentioned with referring to FIGS. 4 to 6 obtains a large displacement (for example, ±200 mm) in the horizontal direction. Accordingly, when a high damping rubber is used as the rubber material in each laminated rubber 32, a vibration isolating support apparatus having high vibration damping properties and excellent vibration isolating properties is obtained without use of additional dampers.

That is, the natural frequency of the multiple laminated rubber assembly 17 in the horizontal direction can be easily set to a value not more than 1 Hz. The rubber has damping properties of equivalent damping coefficient of about 15% and large displacement absorbing properties (for example, about 200 mm) in the horizontal direction so that a vibration isolating support apparatus which is absorbable of a displacement caused by a large earthquake is obtained.

It is noted that in the vibration isolating floor structure shown in FIG. 1, the frame 5 is as low as possible to assure a space between the movable floor 7 and the frame for easily wiring a computer mounted on the movable floor 7.

The vibration isolating support apparatus according to the embodiment of the present invention as mentioned above with referring to FIGS. 1 to 6 is composed of a multiple laminated rubber assembly 17 of a high damping type and the air spring 16 of a bellows type which are vertically stacked so that it is easily possible to set the natural frequency not more than 1 Hz in the horizontal direction and not more than 2 Hz in the vertical direction without additional dampers in a preferable range of 1~10 ton of load per one vibration isolating support apparatus and it is possible to set large displacement (for example, about 200 mm) absorbing properties in the horizontal direction for a light load. The vibration isolating support apparatus has sufficient vibration damping properties in three dimensional directions for any load and a excellent vibration isolating effect.

It is understood that in the illustrated embodiment, the air spring 16 in the form of a bellows is mounted on the multiple laminar rubber assembly 17, but alternatively the multiple laminar rubber assembly 17 may be stacked on the air spring 16.

It will be seen from the above that the vibration isolating support apparatus according to the present invention, comprises an air spring in the form of the bellows and a multiple laminated rubber assembly, the air spring and the multiple laminated rubber assembly are vertically stacked and integrally connected, and the multiple laminated rubber assembly is composed of a plurality of stacks of a plurality of laminated rubbers and a plurality of stabilizing plates inserted between and connected to the upper and power ends of laminated rubbers in the same stages of the stacks. This effectively damps any vibration in three dimensional direction caused by earthquake or the like under any load including a high load and a light load and also to provide an excellent vibration isolating effect.

What is claimed is:

1. A vibration isolating support apparatus comprising; an air spring including a bellows, and a multiple laminated rubber assembly, the air spring and the multiple laminated rubber assembly being vertically stacked, the multiple laminated rubber assembly composed of a plurality of stacks each of a plurality of laminated rubbers and a plurality of stabilizing plates inserted between and connected to the upper and lower ends of the adjacent laminated rubbers in each stage of the stacks, wherein said air spring includes a bellows formed of an air bag filled with air under pressure and end plates fixed to the upper and lower ends thereof.

2. An apparatus claimed in claim 1, wherein the lower end plate is vertically slidable along four guide posts secured to the corners of the upper end plate and at least one guide post has a stop for limiting the maximum compressed position of the air spring.

3. An apparatus claimed in claim 1, wherein the bellows is connected to an auxiliary air tank by an air supply line which is provided with a throttle.

4. An apparatus claimed in claim 3, wherein the auxiliary air tank is connected to an air source such as a compressor by a tube which is provided with a leveling valve.

* * * * *